Aug. 28, 1951  R. O. FERGUSON  2,565,763
HEADLIGHT LENS ATTACHMENT
Filed Nov. 2, 1949
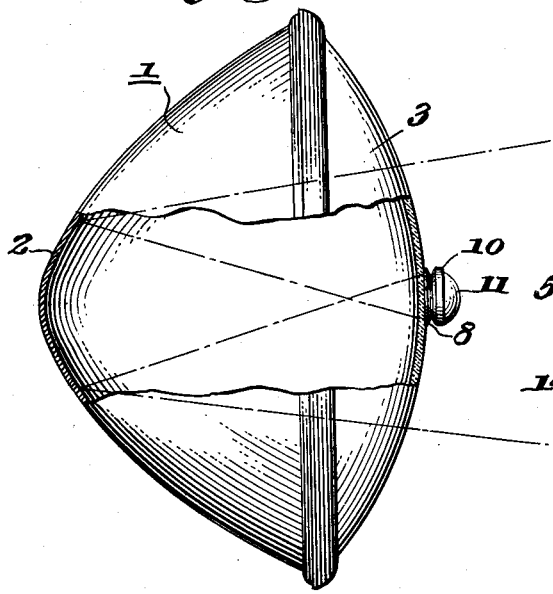
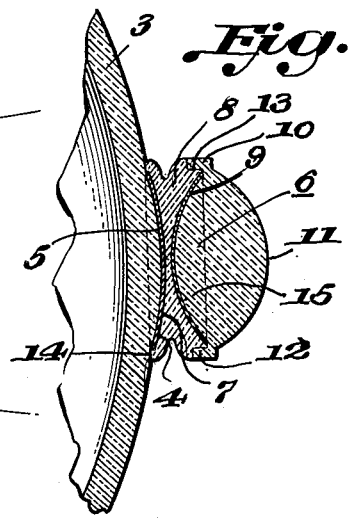
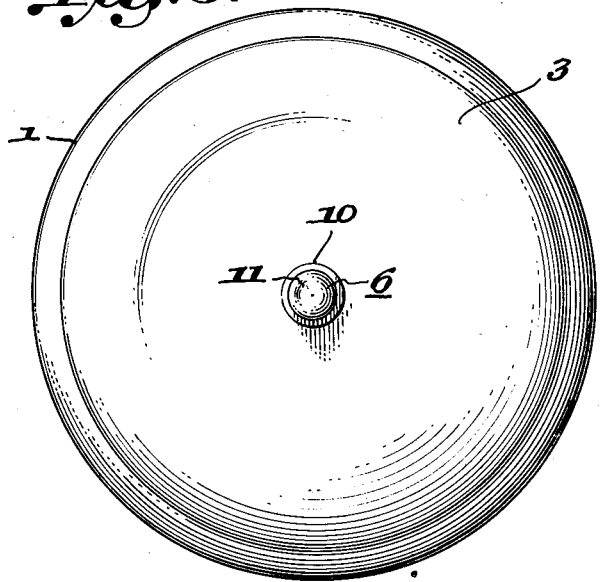
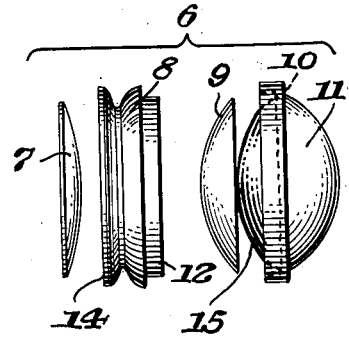
INVENTOR
Robert O. Ferguson,
BY
ATTORNEY Patented Aug. 28, 1951

2,565,763

UNITED STATES PATENT OFFICE 2,565,763

HEADLIGHT LENS ATTACHMENT

Robert O. Ferguson, Bristol, Tenn., assignor of one-half to Bristol Steel & Iron Works, Inc., Bristol, Va., a corporation of Virginia Application November 2, 1949, Serial No. 125,089

7 Claims. (Cl. 240—46.45)

The present invention is concerned with a vehicle headlight lamp, especially of the sealed beam type. In this sealed beam headlight lamp which is in general use at this time, the source of light and the reflector are sealed within the lamp casing.

The present application is a continuation-in-part of my Patent No. 2,512,623, entitled "Headlight Lens," and issued June 27, 1950.

The principal object of the invention is to provide a headlight lamp, with means mounted entirely exteriorly of the main lens, the said means being provided with a reflecting surface whereby at all times and especially upon the failure of the light source within the headlight lamp casing, light beams will be reflected back from an on-coming or approaching car to the driver of said car.

Another object of the invention is to provide a headlight lamp of the sealed beam type which has attached to the lens thereof an element having a reflecting surface which faces in the direction of an on-coming car, whereby the driver of that car may be accurately appraised of the location of the car provided with the said element. Preferably, each headlight lamp is provided with the said elements whereby the position of the car, whether it is moving or is stationary may be determined by the driver of an on-coming car. The reflection of light rays takes place whether or not either or both of the lamps that are provided with said elements are illuminated at the time of approach of the on-coming car.

Still another object of the invention is to provide a headlight lamp having a lens, said lens mounting an element which may include a plurality of reflectors which face in opposite directions, one of said reflectors being adapted to reflect back beams of light projected on it by an on-coming car and the other to reflect back to the ordinary headlight reflector beams of light from the light source of said lamp.

Yet another object of the invention is to provide a reflecting unit or element which may be attached to the standard lens of a sealed beam headlight for effecting one or more of the foregoing objects.

Other objects will appear hereinafter through the specification as the description proceeds.

In the drawings:

Figure 1 is a side elevation partly in vertical section of a form of the invention.

Figure 2 is an enlarged vertical sectional view of a portion of the lens and the reflecting lens unit or element which constitutes the present invention.

Figure 3 is a front elevation of the structure shown in Figure 1 and,

Figure 4 is an exploded view of the various elements of the reflecting lens element or unit which is attached to and may form part of the lens of a sealed beam headlight.

The present invention has in general the same objects as the invention of my prior patent noted above. However, the device of the present invention as distinguished from the invention shown and described in my above referred to patent, may be attached to a sealed beam headlight lens either at the place and at the time of manufacture of said lens, or it may be attached to the headlight lamp at any time subsequent to the manufacture of said lamp. In other words, the device of the present invention may be purchased as a unit and subsequently applied, to the headlight lamp, or the headlight lamp may be sold with the reflector system forming a permanent part thereof. In other words, a motor car or a vehicle may be equipped with headlight lamps having an embodiment of the present invention as permanent parts of said lamps.

Referring to the drawings, numeral 1 represents a headlight casing of modern type, i. e., where the bulb and filament thereof (not herein shown), and the reflector have been hermetically sealed within the headlight casing defined by the numeral 1. Numeral 2 represents the inside back portion of the casing, and it may be suitably silvered to provide a reflecting surface, hereinafter referred to as the inner reflecting member. The lens, shown at 3 is provided with the usual outer convex surface. This lens may have a central secondary lens portion 4 whose outer convex surface 5 has a radius which is shorter than the radius of the major portion of the outer surface of lens 3. The secondary central lens portion 4 of lens 3 is conventional with several makes of cars now on the market. However, it is to be understood that the present invention does not depend upon nor does it necessarily include the said secondary lens portion 4 and its convex outer surface 5. The headlight as provided with such secondary lens and convex outer surface is well adapted, however, for the structure of the present invention.

Numeral 6 represents as a whole the several parts constituting the element or unit that includes the structure of the present invention. In this structure, 7 is the central reflecting member, which preferably is of concavo convex structure and it may conveniently be constructed of tin foil. On the other hand, I may dispense with a tin foil reflecting surface and provide a reflecting surface on the concave inner face of the inner section 8.

Said reflecting surface may be formed in the event a separate element of tin foil or another reflecting member is not used by depositing a silver coating on the inner concave surface of section 8 by any of the well-known methods of applying a so-called silvered surface to a supporting surface. There is an outer reflecting member 9 which also may be constructed of tin foil, or alternatively a silver surface may be applied by any of the well known methods, either to the concave forwardly facing surface of section 8, or the convex rearwardly facing surface of outer section 10. Outer section 10 is also provided preferably with a convex surface 11.

Inner section 8 is provided with a cylindrical forward surface 12 and said outer section 10 may be provided with an inner rear cylindrical surface 13. This inner surface is adapted to telescope the outer cylindrical surface 12 as seen in Figure 2 and when all the parts have been assembled they may be permanently fixed to each other by heat treatment so as to cause all of the parts to permanently assume the position shown in Figures 1, 2, and 3.

The assembled parts shown in Figure 4 constitute the element or unit 6 and this unit may be permanently attached to the lens 3 at the time of manufacture of the lamp or its lens 3, or the unit may be sold as an attachment to a headlight lamp. The inner section 8 is provided with an elliptical surface 14 which extends beyond the periphery of the central reflecting member 7 as seen in Figure 2, and this surface 14 may be attached by fusing with the lens 3, or it may be attached by any suitable and commonly known adhesive.

It will be understood that the inner section 8 instead of having two pieces of tin foil affixed by cement or other suitable attaching means, may have its forwardly and rearwardly facing concave surfaces provided with reflecting coating. It will further be understood that the element or unit 6 in actual practice, will not protrude forwardly from the face of the lens 3 to the extent shown in Figures 1 and 2 of the drawings. The parts of said unit have been enlarged, solely for the purpose of illustration. As constructed for use, the right extremity of the surface 11 will preferably be not over one-half inch in a horizontal line from the outer surface of the lens 3.

Preferably, also, the surface 14 of the inner section has a perimeter that exactly fits the convex outer surface of a conventional headlight lens, such as lens 3, and this outside surface forms the supporting surface for attaching the element or unit shown in Figure 4. The curvature of the holding surface 14 is about the same as a paraboloid whose curvature is the same or substantially the same as the curvature of the lens 3. It will be noted that the elements shown in Figure 4 may be sold as a unit or a single element, and that the unit may be attached by applying a silicon plastic to the surface 14.

It will be appreciated that the central reflecting member 7 may be entirely dispensed with as this element only increases the reflection of rays from the light source, not shown. Both sides of the element 7 may be plain surfaces, and the vertical surfaces of elements 8, 9 and 10 although preferredly concave or convex as shown, may be plain surfaces.

The parts, such as sections 8 and 10 may be made of transparent or translucent material such as any of the well-known resin materials termed "Plastics," or of glass.

It will be appreciated that the construction shown in the several figures provides an "emergency lamp" by means of which the element 6, particularly the reflecting member 9 thereof, reflects back light beams from the headlights of an on-coming car. Very often without the knowledge of the car driver, one of the headlights of his car becomes extinguished because the filament burns out or he forgets to turn on his headlights. Should this take place, the lights of an on-coming car will be reflected back from the reflectors 9 of the headlights 1, and thus warn the driver of an on-coming car who may determine the exact position of the car by means of the units 6 of the car which he is approaching.

It is to be understood that the drawings and description are to be used in an illustrative sense rather than a limited sense and that I desire to be limited in the practice of this invention only as defined by the claims.

I claim:

1. An attachment for the forwardly facing surface of the lens of a headlight comprising a member having a rearwardly facing reflecting surface and a forwardly facing reflecting surface, said member having a leg portion extending around and beyond the periphery of said rearwardly reflecting surface to provide an attaching surface to secure said member to the forwardly facing surface of the lens of the headlight, said member including a portion having a convex surface surrounding and enclosing said forwardly facing reflecting surface.

2. An attachment for the forwardly facing lens of a headlight comprising an element having an inner section and an outer section, means attaching said sections together, said inner section having a rearwardly facing reflecting surface and leg member surrounding the periphery of said reflecting surface to provide an attaching surface to secure the element to the forwardly facing lens of the headlight, said inner section having a forwardly reflecting surface surrounded by said outer section, said outer section having a convex forwardly facing surface.

3. An attachment for a headlight having a primary reflector and a forwardly facing lens comprising a member having a rearwardly facing reflecting surface for reflecting a source of illumination in the headlight back to the primary reflector and thence from the primary reflector through the forwardly facing lens, said member having a forwardly facing reflecting surface whereby upon failure of the source of illumination, said forwardly facing reflecting surface will reflect back light from the lights of an on-coming car and warn the driver thereof of the position of approach of a car provided with said headlight and said member having a leg portion extending around and beyond the periphery of said rearwardly reflecting surface and engageable with the forwardly facing lens to provide an attaching surface to secure said member to the forwardly facing lens of the headlight.

4. An attachment for a headlight having a primary reflector and a forwardly facing lens comprising a first member and a second member, said first member having a rearwardly facing reflecting surface for reflecting a source of illumination in the headlight back to the primary reflector and thence from the primary reflector through the forwardly facing lens, said first member having a forwardly facing reflecting surface whereby upon failure of the source of illumination, said forwardly facing reflecting surface will reflect back light from the lights of an on-coming car and warn the driver thereof of the position of approach of a car provided with said headlight and said first member including a portion surrounding the periphery of said rearwardly reflecting surface and engageable with the forwardly facing lens of a headlight upon attachment of said member thereto, said first member having a cylindrical outer surface and said second member having a cylindrical inner surface telescoping said outer surface, said second member completely surrounding said forwardly facing surface, and means permanently attaching said telescoping surfaces together.

5. An attachment for the forwardly facing surface of the lens of a headlight comprising a member having a rearwardly facing reflecting surface and a forwardly facing reflecting surface, said member having a leg portion extending around and beyond the periphery of said rearwardly reflecting surface to provide an attaching surface to secure said member to the forwardly facing surface of the lens of the headlight, said member including a portion enclosing said forwardly facing reflecting surface.

6. An attachment for the forwardly facing surface of the lens of a headlight comprising a member having a rearwardly facing reflecting surface and a forwardly facing reflecting surface, said member having a leg portion extending around and beyond the periphery of said rearwardly reflecting surface, said leg portion being engageable with the forwardly facing surface of the headlight when said member is secured thereto, said member including a portion enclosing said forwardly facing reflecting surface.

7. An attachment for the forwardly facing surface of the lens of a headlight comprising a member having a rearwardly facing reflecting surface and a forwardly facing reflecting surface, said member having a leg portion extending around and beyond the periphery of said rearwardly reflecting surface, said leg portion having a surface conforming to the contour of the forwardly facing surface of the lens and engageable with said forwardly facing surface when said member is secured thereto, said member including a portion enclosing said forwardly facing reflecting surface.

ROBERT O. FERGUSON.

REFERENCES CITED

The following references are of record in the file of this patent:

UNITED STATES PATENTS

| Number | Name | Date |
|---|---|---|
| 1,537,909 | Wolter | May 12, 1925 |
| 2,064,501 | Taylor | Dec. 15, 1936 |
| 2,113,829 | Condon | Apr. 12, 1938 |
| 2,120,836 | Grimes | June 14, 1938 |
| 2,287,052 | Munroe et al. | June 23, 1942 |

FOREIGN PATENTS

| Number | Country | Date |
|---|---|---|
| 380,676 | Great Britain | Sept. 22, 1932 |